Patented May 27, 1941

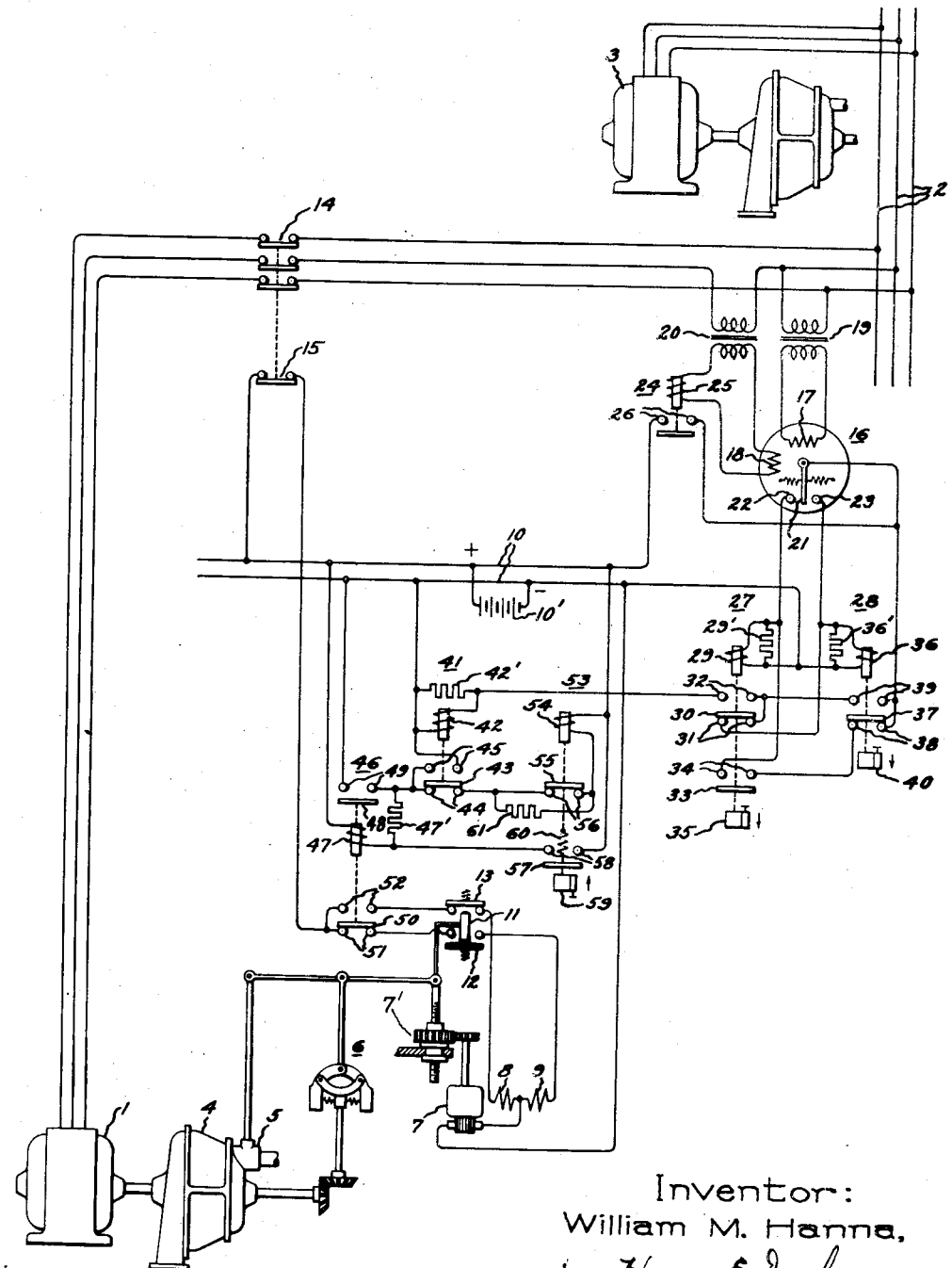

2,243,561

UNITED STATES PATENT OFFICE 2,243,561

ELECTRIC POWER TRANSMISSION SYSTEM

William M. Hanna, Schenectady, N. Y., assignor to General Electric Company, a corporation of New York Application August 1, 1940, Serial No. 349,152

11 Claims. (Cl. 290—4)

My invention relates to electric power transmission systems and more particularly to the transmission of electric power between synchronous machines or systems.

In synchronous power transmission systems, the impedance of the lines and transformers that interconnect the synchronous machines can attain rather high values so that surges caused, for example, by sudden overload, by short circuits to ground or between phases, or by the sudden elimination of certain interconnecting circuits, can bring about a falling out of synchronism or an asynchronous condition of operation between various machines that operated originally in synchronism. Under such circumstances, the synchronous machines of a network may become subdivided into one or more groups, the machines of each group remaining in synchronism with each other but being out of synchronism as regards those of the other groups. Notwithstanding the use of various means to prevent interruptions of synchronism, asynchronous operation may occur either because of some incident at the moment the transmitted power is very high, or when networks of large capacity are interconnected by tie lines of high impedance. It is undesirable to permit asynchronous operation for any length of time since it causes undesirable disturbances in the operation of the system and gives rise to dangerous overvoltage, overcurrent, or excessive temperature conditions. It has been proposed heretofore to maintain a synchronous system intact for power interchange and employ means responsive to a condition, or conditions, characteristic of asynchronous operation to control the prime mover speed regulating means of a synchronous machine operating out of synchronism to effect resynchronization. Such proposals, to my knowledge, which have utilized power reversals as indicating a condition of asynchronous operation have effected a step-by-step and at times a reversing interrupted control of the speed regulating means and have also lacked means to reestablish normal load settings of the prime mover regulating means after resynchronization was effected.

It is an object of my invention to provide a new and improved arrangement for obtaining automatic resynchronization of synchronous machines, or groups of synchronous machines, of a power transmission system while the machines are out of synchronism and connected to the system for power interchange.

In accordance with the illustrated embodiment of my invention, I provide means responsive to repeated power reversals at current values above a predetermined value between a synchronous machine, or circuit, and another synchronous circuit or a bus which will continuously change the speed or frequency of the machine, or circuit, operating asynchronously with its associated circuit until synchronism is reestablished, and also provide means to reset the resynchronizing mechanism to a condition existing prior to the period of asynchronous operation.

My invention will be better understood from the following description, taken in connection with the accompanying drawing in which the single figure is a diagrammatic illustration of one embodiment of my invention, and its scope will be pointed out in the appended claims.

Referring to the drawing a synchronous alternating current generator 1 is connected to an alternating current network 2 including other synchronous generators indicated by the generator 3. The generator 1 is coupled to a prime mover 4, such as a steam turbine, which is supplied with operating fluid through a valve or gate 5 maintained in a position, dependent upon the prime mover speed, by means comprising a governor 6 operated in accordance with the prime mover speed. A pilot motor 7 is arranged to control the setting of the governor 6 through an adjusting mechanism 7' and is provided with oppositely wound field windings 8 and 9 which are arranged to be connected to a source of current or supply bus indicated by the bus 10 supplied by the battery 10'. The circuit of the field windings 8 and 9 is provided with limit stops operated from the governor controlling mechanism and, as shown, comprises a movable member 11 cooperating with limit stop contacts 12 and 13 connected, respectively, in circuit with the field windings 9 and 8. A circuit interrupter 14 is connected between the generator 1 and the bus 2. This circuit interrupter is provided with an auxiliary contact 15 which closes its contacts in a circuit to the pilot motor 7 from the control bus 10 when the circuit interrupter 14 is in its closed position.

The usual power system consists of two or more synchronous generators interconnected with the load consisting of synchronous motors, induction motors, and other reactive impedance loads. The synchronous motor load is usually a relatively small part of the total load, and the induction motors and other reactive impedance loads may be considered as characteristic of the load on the generators when operating out of synchronism with each other. When synchronous generators are out of step, a power transfer of an oscillating nature is set up between them. The power on one generator is first in one direction and then in the other direction of approximately equal magnitudes. In addition to this oscillating power, a constant positive power is delivered by each generator or group of generators. If the load is electrically close to one generator or group of generators, these generators will carry a greater part of the total load than those generators more distant from the load. The generator or group of generators taking the majority of the load slows down and the other generator or group of generators more lightly loaded speeds up. Those machines that are slowing down will usually have power oscillations all above the zero load line; that is, there will be no reversal of power at the terminals of the relatively heavily loaded generators. Those machines that are speeding up will have lost at least part of their normal proportion of load and in general the power oscillations will be from positive to negative power. Half of the power reversals will be at a point of maximum current and half at a point of minimum current. To my knowledge, there are no other known system conditions but that of asynchronous operation which will cause a repetition of power reversal at high currents.

In accordance with this phenomenon of repeated power reversals at high currents during asynchronous operation I provide an arrangement for controlling the speed of those synchronous machines which have a power reversal at their terminals, so that preferably only the speed control mechanism of the prime movers of such machines will be modified to reduce the input to the prime mover associated with the machine speeding up relative to the system or bus frequency and operating out of synchronism therewith.

An arrangement which has been found to operate satisfactorily for this purpose comprises a contact-making wattmeter 16 which is provided with a voltage coil 17 and a current coil 18. The voltage coil 17 is connected to be energized from the terminal connections of generator 1 through a potential transformer 19, and the current coil 18 is connected to be energized in accordance with the current of generator 1 through a current transformer 20. The contact-making wattmeter 16 is provided with a movable contact 21 and two cooperating stationary contacts 22 and 23. An over-current relay 24 is provided with an operating winding 25 connected to be energized in accordance with the current of generator 1 and as illustrated may be connected in series relation with coil 18 to be energized from the current transformer 20. Relay 24 is provided with contacts 26 which are connected in circuit with the movable contact 21 of contact-making wattmeter 16 from the supply bus 10. The overcurrent relay 24 cooperating with the contact-making wattmeter 16 controls the energization of control relays 27 or 28, depending upon the position of the movable contact 21 of contact-making wattmeter 16. Relay 27 is provided with an operating coil 29, a movable contact 30 which cooperates with a pair of normally closed stationary contacts 31, and a pair of normally open contacts 32, and a second movable contact 33 which controls a normally open pair of contacts 34. Relay 27 is preferably provided with a time delay opening mechanism indicated by the dashpot 35. Relay 28 is similarly provided with an operating coil 36 and a movable contact 37 which cooperates with a normally closed pair of contacts 38 and a normally open pair of contacts 39. This relay is also preferably provided with a time delay closing mechanism indicated by the dashpot 40. A resistance 29' is connected across the operating coil 29 and similarly resistor 36' is connected across the operating coil 36 to reduce the time constant of the currents controlled by the contacts of contact-making wattmeter 16.

The contact-making wattmeter 16 and associated relays 27 and 28 are utilized to control additional relay mechanism which controls the speed regulating mechanism comprising governor control 6, pilot motor 7, and adjusting mechanism 7'. For this purpose I have shown a relay 41 comprising an operating coil 42 and a movable contact 43 which cooperates with a normally closed pair of contacts 44 and a normally open pair of contacts 45. The operating coil 42 is energized from the bus 10 with a resistor 42' connected in parallel with the operating coil 42 and which, in turn, is in circuit with contacts 32 and 39 of relays 27 and 28. The resistor 42' is a reference employed to use the time constant of the circuit controlling relay 41. Relay 41 controls another relay 46 comprising an operating coil 47 and a movable contact 48 cooperating with a pair of normally open stationary contacts 49, and a movable contact 50 cooperating with a pair of normally closed stationary contacts 51 and a pair of normally open stationary contacts 52. These contacts are connected in circuit with the pilot motor of field windings 8 and 9. The operating coil 47 of relay 46 is energized from the bus 10 through the contacts 45 of relay 41 when relay 41 is picked up. A resistor 47' is connected in series relation with the coil 47 across the bus 10 when its contacts are closed so that relay 46 seats itself in after being picked up by relay 41. The relay 46 also controls a timing relay 53 for effecting resetting of the governor control mechanism 6 and 7'. Timing relay 53 comprises an operating coil 54, a movable contact 55 cooperating with normally closed stationary contacts 56, and a movable contact 57 cooperating with normally open stationary contacts 58 which when closed short-circuit the operating coil 47 of relay 46. The resistor 47' also prevents a short-circuit of control bus 10 when coil 47 is short-circuited by contacts 58. The movable contact 57 is provided with a timing mechanism indicated by the dashpot 59 and spring 60. A resistor 61 is connected in shunt to the stationary contacts 56 to reduce the energization of coil 54 after relay 53 has picked up.

The operation of the illustrated embodiment is substantially as follows: It will be assumed that the circuit interrupter 14 is in its closed position and that generator 1 is supplying power to the bus 2 and is operating in synchronism therewith and with generator 3. With circuit interrupter 14 in its closed position, its auxiliary or back contacts 15 are closed to permit an energizing circuit to be established by relay 46 from control bus 10 for the pilot motor 7. The pilot motor 7 will not be energized although the contacts 51 of relay 46 are closed since the assumed conditions of operation would have caused the movable member 11 to open the limit switch contacts 12 for the normal load setting at synchronous operation. The contact-making wattmeter 16 will have one set of contacts closed depending upon the direction of power flow. For purposes of explanation, we will assume that the movable contact 21 engages contact 22. Under this condition, however, none of the operating coils of the control relays 27, 28, 41, or 46 is energized since the contacts of the overcurrent relay 24 are in the open position. Now assume that an overcurrent condition exists and that relay 24 is energized to close its contacts 26. Since we have assumed that the contacts 21 and 22 are in engagement, the operating coil 29 of relay 27 will be energized from the positive terminal of bus 10, through contact 26, contacts 21—22 of relay 16, coil 29 to negative terminal of control bus 10. If now the power to generator 1 reverses with relay 27 picked up, the movable contact 21 will move to the stationary contact 23, thereby energizing the operating coil 36 of relay 28. Since relays 27 and 28 are provided with time delay dropout, both relays 27 and 28 will for a short time be picked up simultaneously. Under this condition, contacts 32 of relay 27 and contacts 39 of relay 28 are closed, thereby establishing through contact 26 of overcurrent relay 24 an energizing current for the operating coil 42 of relay 41 from the control bus 10. When the relay 41 is energized, its normally open contacts 45 are closed to close an energizing circuit from bus 10 for the operating coil 47 of relay 46 which seals itself in through resistor 47' and its own contacts 49. When relay 46 picks up, it closes its normally open stationary contacts 52 to complete a circuit from the bus 10 for the field winding 8 of pilot motor 7 through the closed contact 13 of the limit switch to effect closing of the valve 5 to a point determined by the setting of limit switch 13. In addition to starting the closing action of the pilot motor 7, the picking up of relay 46 also closes an energizing circuit for timing relay 53 after relay 41 drops to its deenergized position. Relay 41 is a rapidly opening and closing relay and drops to its deenergized position as soon as the power reversals at high current cease and relays 27 and 28 are not closed simultaneously.

For rapid reversals of power at high current, the relays 27, 28, and 41 remain picked up so that the relay 46 remains closed and the pilot motor 7 continues to close the valve until stopped by the opening of limit switch 13 by movable member 11. If the rapid reversals of power at high current cease and resynchronization is established, relay 41 drops to its deenergized position and closes an energizing circuit for timing relay 53 which times out and closes its contacts 58 to short circuit coil 47 of relay 46 and thereby causes relay 46 to drop out and closes its contacts 51. Since pilot motor 7 will have been moved from the normal load setting at which contacts 12 were open toward a valve closing position, contacts 12 will be closed and the deenergization of relay 46 will cause contacts 51 to close. The closing of contacts 51 establishes a valve-opening circuit for the pilot motor 7 through contacts 12 so that the valve mechanism 5 is then reset to the load valve setting existing before the asynchronous condition occurred as determined by the setting of the limit switch 12.

For slow reversals of power, relays 27 and 28 remain closed simultaneously for only a short time and, hence, relay 41 remains picked up for only short intervals. Consequently, the timing relay 53 is energized as soon as relay 41 is deenergized after relay 46 has once picked up and starts its timing action to close its contacts 58. However, if any reversal of power takes place before relay 53 has timed out, it will be deenergized by the energization of relay 41 and will then start retiming again for its full timing period unless interrupted by a power reversal after the timing action starts. If the timing action is completed, contact 58 closes and deenergizes relay 46 and permits the governor mechanism to be reset to the load valve setting existing before the asynchronous condition occurred, as previously explained. Thus, whether the power reversals are rapid or relatively slow, the governor mechanism is reset to the normal load governor setting a predetermined time after the resynchronization is established.

While I have shown and described a particular embodiment of my invention, it will occur to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. The combination of a plurality of synchronous alternating current circuits for operation in synchronism, means for controlling the relative frequencies of said circuits, means operable in accordance with an asynchronous condition of operation between said circuits while said circuits are interconnected for power interchange for operating said first mentioned means continuously in one direction until synchronism is restored between said circuits, and means for resetting said first mentioned means to a condition existing prior to said asynchronous condition of operation.

2. The combination of a plurality of synchronous alternating current circuits for operation in synchronism, means for controlling the frequency of one of said circuits, means operable in accordance with an asynchronous condition of operation between said circuits while said circuits are interconnected for power interchange for operating said first mentioned means to restore synchronism between said circuits, and means for resetting said first mentioned means to a condition existing prior to said asynchronous operation a predetermined interval of time after said asynchronous condition of operation is terminated.

3. The combination of a plurality of synchronous alternating current circuits for operation in synchronism, reversible means for controlling the frequency of one of said cicuits, means operable in accordance with an asynchronous condition of operation between said circuits while said circuits are interconnected for power interchange for operating said first mentioned means continuously in one direction to restore synchronism between said circuits, and means operable a predetermined interval of time after said asynchronous condition terminates for interrupting the operation of said first mentioned means in said one direction and effecting operation of said first mentioned means in the reverse direction.

4. The combination of a plurality of synchronous alternating current circuits for operation in synchronism, means for controlling the relative frequencies of said circuits, and means responsive to successive power reversals at current values above a predetermined value for operating said first mentioned means continuously in one direction until synchronism is restored between said circuits.

5. In an alternating current system, a power circuit, a dynamo-electric machine connected to said circuit for synchronous operation therewith, a prime mover coupled to said dynamo-electric machine, means for controlling the power input to said prime mover, means responsive to successive power reversals at current values above a predetermined value for operating said first mentioned means continuously in one direction during asynchronous operation of said generator to restore synchronous operation between said dynamo-electric machine and said circuit.

6. In an alternating current system, synchronous dynamo-electric machines included therein, means for increasing and decreasing the speed of one of said dynamo-electric machines, means connected to the output circuit of said one dynamo-electric machine and responsive to repeated power reversals between said one dynamo-electric machine and said system at current values above a predetermined value for controlling said first mentioned means to effect a decrease in the speed of said one dynamo-electric machine during asynchronous operation thereof with said system, and means operative a predetermined time after said power reversals terminate for reversing the operation of said first mentioned means and returning said means to its setting existing prior to said asynchronous operation.

7. In an alternating current system, synchronous dynamo-electric machines included therein, a prime mover for driving one of said dynamo-electric machines, a governor mechanism for controlling the power input to said prime mover, means for modifying said governor mechanism to increase and decrease the power input to said prime mover, a power directional relay connected to be responsive to the interchange of power between said one machine and said system, an overcurrent relay connected to be responsive to the current interchanged between said one machine and said system above a predetermined value and cooperating with said power directional relay to control said first mentioned means to effect a decrease in the power input to said prime mover for repeated reversals of power at currents above said predetermined value of current, and means operative at the termination of said power reversals for effecting after a predetermined interval of time operation of said first mentioned means to increase the power input to said prime mover.

8. In an alternating current system, a power circuit, an alternating current generator connected to said circuit for synchronous operation therewith, a prime mover coupled to said generator, means for controlling the power input to said prime mover including a speed governing mechanism normally set for a predetermined load for synchronous operation of said generator, means operative when said generator is operating asynchronously with said circuit for changing the setting of said speed governing mechanism to decrease the power input to said prime mover until said generator regains synchronism with said circuit, and means for resetting said speed governing mechanism to its normal setting for said predetermined load at synchronous operation.

9. In an alternating current system, a power circuit, an alternating current generator connected to said circuit for synchronous operation therewith, a prime mover coupled to drive said generator, means for controlling the power input to said prime mover including a speed governing mechanism, means including a relay for changing the setting of said speed governing mechanism to change the power input to said prime mover, means responsive to repeated power reversals to said generator at current values above a predetermined value for causing said relay to decrease the power input to said prime mover, said relay being provided with means to maintain said relay in its condition to decrease said power input after operation of said relay independently of said power reversals, and means actuated simultaneously with the actuation of said relay for terminating said action of said relay to effect a decrease in said power input a predetermined interval of time after said power reversals terminate.

10. In an alternating current system, a power circuit, an alternating current generator connected to said circuit for synchronous operation therewith, a prime mover coupled to drive said generator, means for controlling the power input to said prime mover including a speed governing mechanism normally set for a predetermined load for synchronous operation of said generator, means including a relay for changing the setting of said speed governing mechanism to change the power input to said prime mover, means including a relay having a circuit for sealing itself in an energized position when once energized, means including a power directional relay and an overcurrent relay connected to be energized from the terminals of said generator for energizing said first mentioned relay upon repeated power reversals to said generator above a predetermined value of current, said first mentioned relay when energized being arranged to cause said speed governing mechanism to decrease the power input to said generator, a timing relay energized simultaneously with the energization of said first mentioned relay for effecting deenergization of said first mentioned relay a predetermined interval of time after said power reversals terminate, and means associated with said governing mechanism and actuated by said first mentioned relay when deenergized for resetting said governing mechanism to its normal load setting for synchronous operation of said generator.

11. In an alternating current system, a power circuit, an alternating current generator connected to said power circuit for synchronous operation therewith, a prime mover coupled to drive said generator, means for controlling the power input to said prime mover including a speed governing mechanism normally set for a predetermined load for synchronous operation of said generator, means for changing the setting of said speed governing mechanism including a reversible pilot motor, means including a first relay when deenergized for actuating said pilot motor in a direction to increase the power input to said prime mover and when energized to decrease the power input to said prime mover, a second relay for controlling the energization and deenergization of said first relay, a pair of relays for controlling said second relay and each being provided with means to delay the opening thereof after deenergization, a power directional relay connected to be responsive to the power interchange between said generator and said power circuit, an overcurrent relay connected to be energized from the terminal connections of said generator and cooperating with said power directional relay to control said pair of relays, the simultaneous energization of said pair of relays being arranged to effect energization of said second relay, and a timing relay connected to be energized and deenergized in response to the energization and deenergization of said second relay and being provided with a contact which effects deenergization of said first relay a predetermined time after said timing relay is energized.

WILLIAM M. HANNA.